(12) United States Patent
Choi et al.

(10) Patent No.: US 9,513,404 B1
(45) Date of Patent: Dec. 6, 2016

(54) APPARATUS FOR METEOROLOGICAL OBSERVATION USING AT LEAST ONE METEOROLOGICAL SENSOR

(71) Applicant: National Institute Of Meteorological Research, Seoul (KR)

(72) Inventors: Kyu Young Choi, Jeju-do (KR); Jong Chul Ha, Jeju-do (KR); Kwang Deuk Ahn, Jeju-do (KR); Young Jun Cho, Jeju-do (KR)

(73) Assignee: National Institute of Meteorological Research, Seoul (KR)

( * ) Notice: Subject to any disclaimer, the term of this patent is extended or adjusted under 35 U.S.C. 154(b) by 0 days.

(21) Appl. No.: 15/198,507

(22) Filed: Jun. 30, 2016

(30) Foreign Application Priority Data

Jun. 30, 2015 (KR) .................. 10-2015-0092684

(51) Int. Cl.
 G01W 1/00 (2006.01)
 G01W 1/08 (2006.01)
 G01W 1/18 (2006.01)
(52) U.S. Cl.
 CPC ........ G01W 1/08 (2013.01); G01W 1/18 (2013.01)
(58) Field of Classification Search
 CPC .................. G01W 1/08; G01W 1/18
 USPC ........................... 73/170.16, 170.28
 See application file for complete search history.

(56) References Cited

U.S. PATENT DOCUMENTS 5,184,160 A * 2/1993 Massarsky ............. G03B 17/53
 396/2

* cited by examiner

*Primary Examiner* — Lisa Caputo
*Assistant Examiner* — Roger Hernandez-Prewit
(74) *Attorney, Agent, or Firm* — Husch Blackwell LLP (57) ABSTRACT

An apparatus for meteorological observation is provided. The apparatus includes: a body part; a coupling part which moves along a first and a second guiding routes alternatively by a motor; a sensor part which rotates according to a movement of the coupling part; and a shoot controlling part for measuring data of the upper atmosphere when the coupling part is placed on the top guiding member while moving along the first guiding route, (ii) measuring data of front lower atmosphere when the coupling part is placed on the first branch while moving along the first guiding route, (iii) measuring data of the upper atmosphere when the coupling part is placed on the top guiding member while moving along the second guiding route, and (iv) measuring data of rear lower atmosphere when the coupling part is placed on the second branch while moving along the second guiding route.

20 Claims, 6 Drawing Sheets

APPARATUS FOR METEOROLOGICAL OBSERVATION USING AT LEAST ONE METEOROLOGICAL SENSOR

CROSS REFERENCE TO RELATED APPLICATION

This application claims priority to and incorporates herein by reference all disclosure in Korean Patent Application No. 10-2015-0092684 filed Jun. 30, 2015.

FIELD OF THE INVENTION

The present invention relates to an apparatus for meteorological observation that uses at least one meteorological sensor, and more particularly, to the apparatus for effectively controlling movement of the meteorological sensor by using only one motor in order to calibrate meteorological data acquired by the meteorological sensor.

BACKGROUND OF THE INVENTION

On one hand, a whisk broom technique as a scanning technology by using a sensor can be used for meteorological observation. However, the whisk broom technology allows space information to be obtained without complicated calculation by scanning the atmosphere in a straight line, but it has a problem of causing spatial distortion due to a difference of an angle between a sensor and a scanned trajectory.

On the other hand, a conical scan technique, as a technology of shooting images while rotating conically, does not cause the spatial distortion due to a difference of an angle, but has a problem in that it requires two motors to calibrate measured meteorological data. For example, on the assumption that a meteorological sensor is mounted on an air vehicle, it is necessary to adopt a first motor for applying a rotational force to the meteorological sensor to make the meteorological sensor scan conically while the meteorological sensor is looking downwards and at the same time it is necessary to adopt a second motor for applying a rotational force to the meteorological sensor to make the meteorological sensor be placed upwards to thereby obtain a comparative value for calibrating the meteorological data. For reference, a reason for obtaining the comparative value when the meteorological sensor is looking upwards will be explained by using an example of "temperature" data. On the assumption that the air vehicle with the meteorological sensor moves in the lower stratosphere, since it is known to the public that the temperature in the lower stratosphere is constant, the corresponding constant may be set as a reference value and a temperature data measured by the meteorological sensor while the meteorological sensor is looking upwards (i.e., looking the lower stratosphere) may be used as the comparative value to be compared with the reference value. By using a difference between the reference value and the comparative value, meteorological data measured when the meteorological sensor is looking downwards could be calibrated. For example, if it is assumed that the reference value is −56.5° C. and the comparative value is −55.5° C., it can be estimated that the meteorological sensor measures the temperature data higher by 1° C. Therefore, the meteorological sensor may be under the state of receiving more heat by 1° C. Accordingly, the temperature data acquired when the meteorological sensor is looking downwards, i.e., toward the troposphere, must be calibrated as much as −1° C.

As the measurement of meteorological data by using the conical scan technique does not cause spatial distortion, the conical scan technique is more generally used than the whisk broom technique, but it has a drawback in that it needs two motors to calibrate the meteorological data. Accordingly, the conical scan technique has problems of the increased loads and the increased costs. Thus, the inventor intends to suggest an apparatus for meteorological observation that may successfully perform calibration of the meteorological data by using only one motor without any spatial distortion.

SUMMARY OF THE INVENTION

It is an object of the present invention to solve all the aforementioned problems.

It is another object of the present invention to provide an apparatus capable of obtaining meteorological data by using only one motor without spatial distortion.

In accordance with one aspect of the present invention, there is provided an apparatus for meteorological observation that uses at least one meteorological sensor, including: a cylinder-shaped body part with a cross section in a certain shape, wherein the cross section is a section formed by cutting off the body part at a right angle to a longitudinal direction of the cylinder, wherein, on the assumption that the longitudinal direction of the cylinder of the body part is aligned substantially horizontally to the ground, a top guiding member is formed on a top contour surface of the body part and at least two bottom guiding members are formed on a bottom contour surface thereof, and wherein the at least two bottom guiding members, which include a first branch and a second branch, are branched off from both ends of the top guiding member; a coupling part which moves along a first and a second guiding routes alternatively by a specific motor, wherein the first guiding route includes the route by the top guiding member and a route by the first branch among the at least two bottom guiding members and the second guiding route includes the route by the top guiding member and a route by the second branch among the at least two bottom guiding members; a meteorological sensor part which rotates according to a movement of the coupling part; and a shoot controlling part for operating (i) to allow the meteorological sensor part to measure meteorological data of the upper atmosphere when the coupling part is placed on a certain position of the route by the top guiding member while the coupling part moves along the first guiding route, (ii) to allow the meteorological sensor part to measure meteorological data of front lower atmosphere along a first trajectory when the coupling part is placed on a specified section of the route by the first branch while the coupling part moves along the first guiding route, (iii) to allow the meteorological sensor part to measure meteorological data of the upper atmosphere when the coupling part is placed on a certain position on the route by the top guiding member while the coupling part moves along the second guiding route, and (iv) to allow the meteorological sensor part to measure meteorological data of rear lower atmosphere along a second trajectory when the coupling part is placed on a specified section of the route by the second branch while the coupling part moves along the second guiding route.

In accordance with another aspect of the present invention, there is provided an apparatus for meteorological observation that uses at least one meteorological sensor, including: a cylinder-shaped body part with a cross section in a certain shape, wherein the cross section is a section formed by cutting off the body part at a right angle to a longitudinal direction of the cylinder, wherein, on the assumption that the longitudinal direction of the cylinder of the body part is aligned substantially horizontally to the ground, at least two top guiding members are formed on a top contour surface of the body part and a bottom guiding member is formed on a bottom contour surface thereof, and wherein the at least two top guiding members, which include a first branch and a second branch, are branched off from both ends of the bottom guiding member; a meteorological sensor part which includes a pin part and at least one sensor module, wherein the pin part which moves along a first and a second guiding routes alternatively by a specific motor, wherein the first guiding route includes a route by the first branch among the at least two top guiding members and a route by the bottom guiding member and the second guiding route includes a route by the second branch among the at least two top guiding members and the route by the bottom guiding member, and wherein the sensor module that moves along a moving trajectory of the pin part by being directly or indirectly combined with the pin part; and a shoot controlling part for operating (i) to allow the sensor module to measure meteorological data of the upper atmosphere when the pin part is placed on a certain position of the route by the bottom guiding member while the pin part moves along the first guiding route, (ii) to allow the sensor module to measure meteorological data of front lower atmosphere when the pin part is placed on a specified section of the route by the first branch while the pin part moves along the first guiding route, (iii) to allow the sensor module to measure meteorological data of the upper atmosphere when the pin part is placed on a certain position of the route by the bottom guiding member while the pin part moves along the second guiding route, and (iv) to allow the sensor module to measure meteorological data of rear lower atmosphere when the pin part is placed on a specified section of the route by the second branch while the pin part moves along the second guiding route.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

To make purposes, technical solutions, and advantages of the present invention clear, reference is made to the accompanying drawings that show, by way of illustration, more detailed example embodiments in which the invention may be practiced. These embodiments are described in sufficient detail to enable those skilled in the art to practice the invention.

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Detailed explanation will be made by referring to the attached drawings with respect to the desirable example embodiments of the present invention to make those skilled in the art practice the invention For reference, meteorological sensors mentioned in the present invention may be various types of sensors. For example, it may be a microwave radiometer for measuring amount of atmospheric water vapor or temperature, etc. and also may be a camera module for shooting images, but it is not limited to these.

Figure 1A:
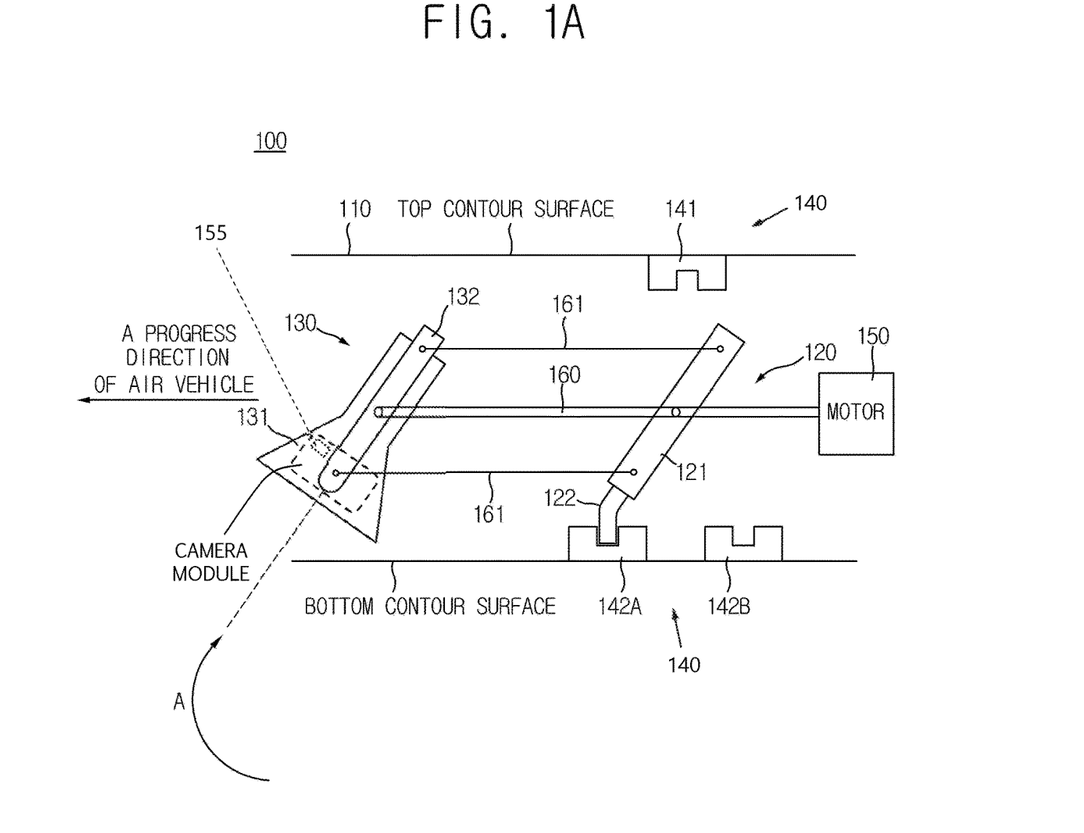
FIGS. 1A to 1C are drawings of cross section representing a configuration and an operation of an apparatus for meteorological observation in accordance with a first example embodiment of the present invention.
Figure 1B:
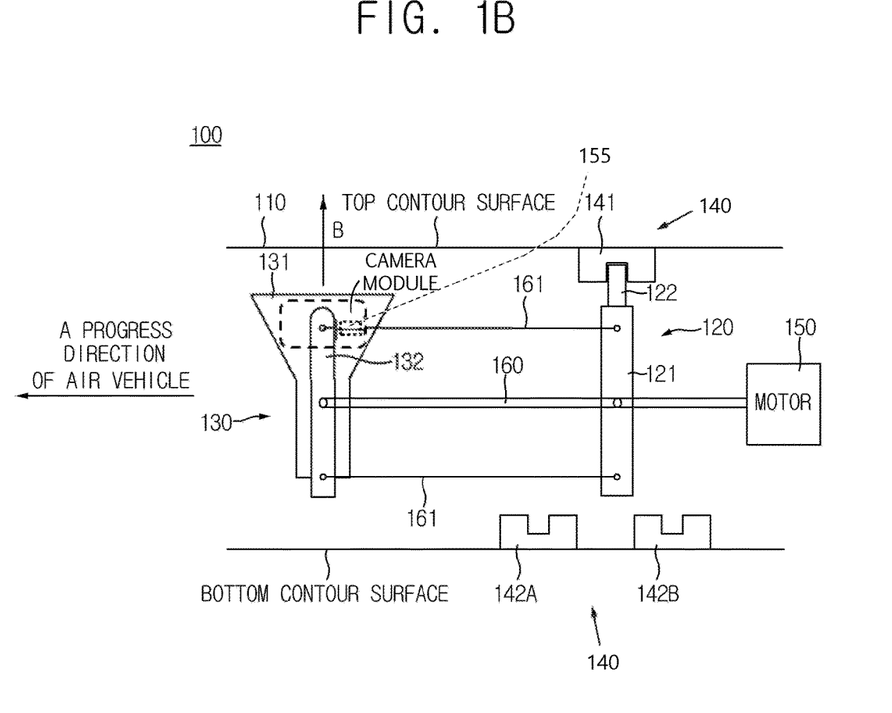
Figure 1C:
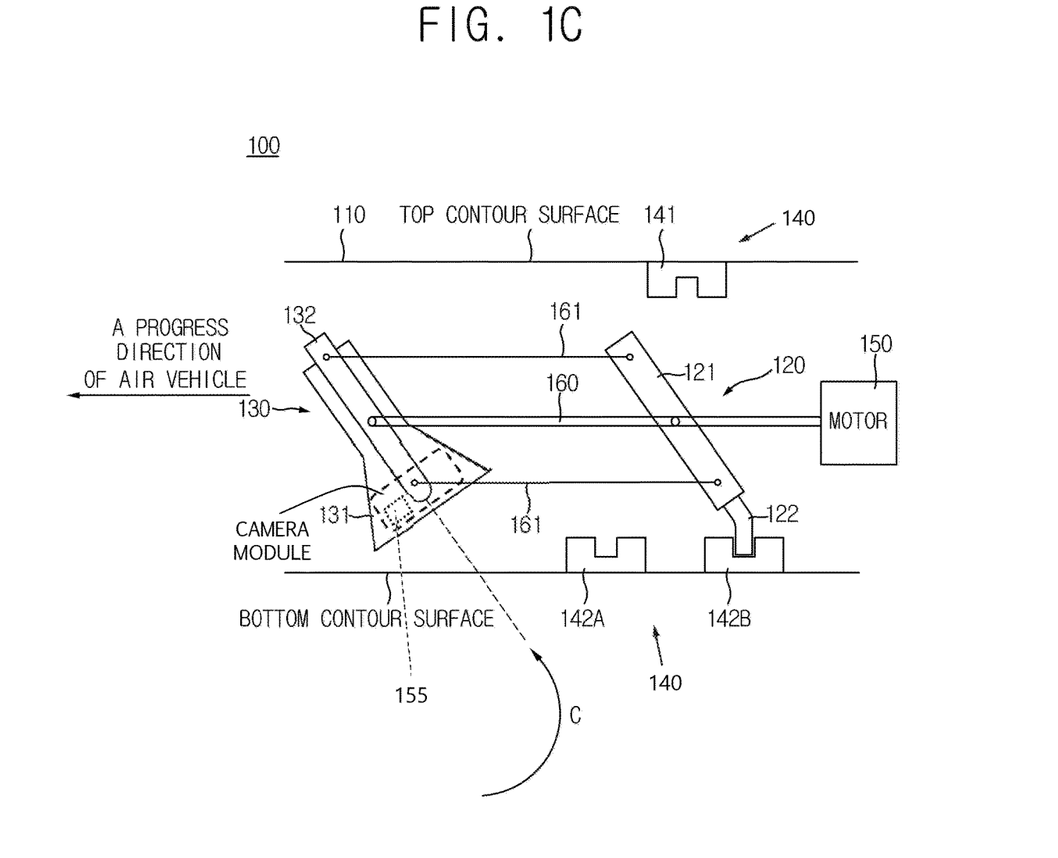

FIGS. 1A to 1C are drawings of cross section representing a configuration and an operation of an apparatus for meteorological observation in accordance with a first example embodiment of the present invention.

By referring to FIGS. 1A to 1C, an apparatus 100 for meteorological observation may include a body part 110, a coupling part 120, a meteorological sensor part 130, a guiding member 140, a motor 150 and a shoot controlling part 155. Besides, the apparatus 100 for meteorological observation may further include a center connection part 160 for connecting the coupling part 120, the meteorological sensor part 130, and the motor 150, and also may include auxiliary connection parts 161 for supporting the coupling part 120 to move stably.

First of all, in FIGS. 1A to 1C, the apparatus 100 for meteorological observation includes the body part 110 which is formed in a shape of a cylinder with a cross section in a certain shape. Herein, the body part 110 may have a shape of a cylinder or a cam gear, but it is not limited to this. In the body part 110, the coupling part 120, the meteorological sensor part 130, and the guiding member 140 may be placed and also the motor 150 may be placed, as the case may be. To do this, the body part 110 may be hollow. In addition, a top guiding member 141 and bottom guiding members 142 may be formed on the internal surface of the body part 110. For reference, in the present invention (including the first example embodiment and the second example embodiment), if it is assumed that the body part in a shape of a cylinder is divided equally into two equal parts, a guiding member formed on the upper part may be called a top guiding member and guiding members formed on the lower part may be named bottom guiding members, but they are not limited to these. A variety of examples could also be assumed. For example, the guiding member formed on an upper side of specific points slightly inclined toward the uppermost peaks could be named a top guiding member and the guiding members formed on a lower side of the specific points could be called bottom guiding members.

Herein, the cross section is a section formed by cutting off the body part 110 at a right angle to a longitudinal direction of the cylinder. On the assumption that the longitudinal direction of the body part 110 is aligned substantially horizontally to the ground, the top guiding member 141 could be formed on a top contour surface of the body part 110 and the bottom guiding members 142 could be formed on a bottom contour surface thereof. More specifically, the top guiding member 141 could be formed on the top contour surface of the body part 110 and the bottom guiding members 142, which include at least two branches 142A and 142B, could be branched off from both ends of the top guiding member 141. For reference, explanation will be made with an example that the body part 110 has a cylindrical shape.

The coupling part 120 may move along a first guiding route and a second guiding route alternatively by a motor 150. In the present invention, "moving alternatively" means moving, for example, in order of the first guiding route, the second guiding route, the first guiding route, the second guiding route, etc. but it is not limited to this. It also could include slightly irregular alternation such as order of the first guiding route, the first guiding route, the second guiding route, the second guiding route, the first guiding route, the first guiding route, etc. or order of the first guiding route, the second guiding route, the second guiding route, the first guiding route, the second guiding route, the first guiding route, etc.

More preferentially, the first guiding route includes a route by the top guiding member 141 and a route by the branch 142A among at least two branches of the bottom guiding members 142 and the second guiding route includes the route by the top guiding member 141 and a route by the branch 142B thereamong.

In addition, it was illustrated in the present invention that the bottom guiding members 142 include the two branches 142A, 142B, but the bottom guiding members 142 may include more than two branches.

Next, the coupling part 120 may include a stick-shaped rod part 121. Herein, the rod part 121 is explained as a shape of a stick, but the shape of the rod part 121 is not limited to this.

On one end of the rod part 121 of the coupling part 120, a pin part 122 may be attached. When the coupling part 120 receives a rotational force provided by the motor 150, the rod part 121 and the pin part 122 attached thereto may move due to the rotational force. In detail, the pin part 122 may move along the top guiding member 141 or the bottom guiding members 142 by interlocking with grooves of the top guiding member 141 or the bottom guiding members 142 and accordingly the rod part 121 may rotate.

Herein, the pin part 122 and the rod part 121 could be combined to make an angle between the pin part 122 and the rod part 121 be adjustable while the pin part 122 moves along the first guiding route or the second guiding route.

A connection member flexible to a change of an angle between the pin part 122 and the rod part 121 could be additionally installed between the pin part 122 and the rod part 121. For example, if the coupling part 120 moves with the pin part 122 interlocking with the top guiding member 141 (See FIG. 1B), the connection member could support the pin part 122 to be inserted into the top guiding member 141 in a direction same to the longitudinal direction of the rod part 121 and if the coupling part 120 moves with the pin part 122 interlocking with a groove of the branch 142A corresponding to the first branch among the bottom guiding members 142 (See FIG. 1A), the connection member could adjust an angle between the pin part 122 and the rod part 121 to allow the pin part 122 to be inserted into the groove of the branch 142A. If the coupling part 120 moves with the pin part 122 interlocking with a groove of the branch 142B corresponding to a second branch among the bottom guiding members 142 (See FIG. 1C), the connection member could adjust the angle between the pin part 122 and the rod part 121 to allow the pin part 122 to be inserted into the groove of the branch 142B. Of course, it is not limited to these. It could be assumed that the angle between the pin part 122 and the rod part 121 is not changed while the pin part 122 moves along the first guiding route or the second guiding route. An example could be implemented by adjusting heights and angles of at least some of the top guiding member and the bottom guiding members as shown in the second example embodiment to be explained later. In other words, it could be sure that an example of adjusting the heights and the angles of the at least some of the top guiding member and the bottom guiding members as shown in the second example embodiment could be applied even to the first example embodiment as it is.

The meteorological sensor part 130 may rotate according to the movement of the coupling part 120 and the meteorological sensor part 130 may include a sensor module 131 and a connection module 132. Herein, when the meteorological sensor part 130 rotates according to the movement of the coupling part 120, a direction of the sensor module 131 included in the meteorological sensor part 130 may be same as that of the rod part 121 of the coupling part 120.

More specifically, while the coupling part 120 moves along the first guiding route, as shown in FIG. 1B, when it is placed on a certain position on the route by the top guiding member 141 of the first guiding route, the meteorological sensor part 130 rotates upwards according to the movement of the coupling part 120. At the time, the shoot controlling part 155 may allow the meteorological sensor part 130 to measure meteorological data of the upper atmosphere (indicated as "B" in FIG. 1B) which will be used as comparative data, so-called first comparative data, to be explained later. Herein, the meteorological sensor part 130 could measure the meteorological data towards the upper atmosphere at a right angle, but it is not necessary to be at the right angle.

Moreover, while the coupling part 120 moves along the first guiding route, as shown in FIG. 1A, when it is placed on a certain section of the route by the left branch 142A, the meteorological sensor part 130 rotates toward front lower directions according to the movement of the coupling part 120. At the time, the shoot controlling part 155 may allow the meteorological sensor part 130 to measure meteorological data of front lower atmosphere along a first trajectory (indicated as "A" in FIG. 1A) induced by the first branch 142A. Herein, the measured meteorological data of front lower atmosphere along the first trajectory may be calibrated by referring to comparative data and reference data. This will be explained later.

While the coupling part 120 moves along the second guiding route, as shown in FIG. 1B, when it is placed on a certain position on the route by the top guiding member 141, the meteorological sensor part 130 rotates upwards according to the movement of the coupling part 120. This is just as explained above. Similarly, at the time, the meteorological sensor part 130 may measure meteorological data of the upper atmosphere by the shoot controlling part 155. Herein, the measured meteorological data of the upper atmosphere may be used as the comparative data, so-called the second comparative data, to be explained later. For reference, both or either of the first and the second comparative data may be used.

While the coupling part 120 moves along the second guiding route, as shown in FIG. 1C, when it is placed on a certain section of the route by the right branch 142B among the bottom guiding members 142 of the second guiding route, the meteorological sensor part 130 may rotate toward rear lower directions according to the movement of the coupling part 120. At the time, the meteorological sensor part 130 measures meteorological data of rear lower atmosphere along a second trajectory (indicated as "C" in FIG. 1C) by the shoot controlling part 155. Herein, the measured meteorological data of rear lower atmosphere along the second trajectory may be calibrated by referring the comparative data and the reference data to be explained later.

As explained above, the first trajectory is shown as "A" in FIG. 1A and the second trajectory is shown as "C" in FIG. 1C. The trajectories A and C being put together have substantially a circular shape. Based on the direction of a progress direction of an air vehicle, front and rear scans may be constantly maintained and accordingly, spatial distortion can be prevented.

A certain portion of the body part 110 could be opened or be composed of transparent material if necessary to measure the meteorological data through the sensor module 131.

Next, the apparatus 100 for meteorological observation may further include the center connection part 160 which connects the motor 150, a center of rotation of the coupling part 120, and a center of rotation of the meteorological sensor part 130. The motor 150 may support the coupling part 120 to move by allowing the center connection part 160 to rotate according to the rotational axis of the motor 150 and then the meteorological sensor part 130 may rotate by the movement of the coupling part 120.

Multiple auxiliary connection parts 161 which connect both ends of the rod part 121 of the coupling part 120 to both ends of the meteorological sensor part 130 may be further included. When the motor 150 rotates the center connection part 160 according to the rotational axis of the motor 150, the auxiliary connection parts 161 may support the coupling part 120 and the meteorological sensor part 130 to move stably. In FIG. 1, it is assumed that two auxiliary connection parts 161 are included, but it is not limited thereto.

In FIGS. 1A to 1C, explanation was made on assumption that the meteorological sensor part includes one sensor module, but the meteorological sensor part may include two or more sensor modules, as the case may be.

Figure 2A:
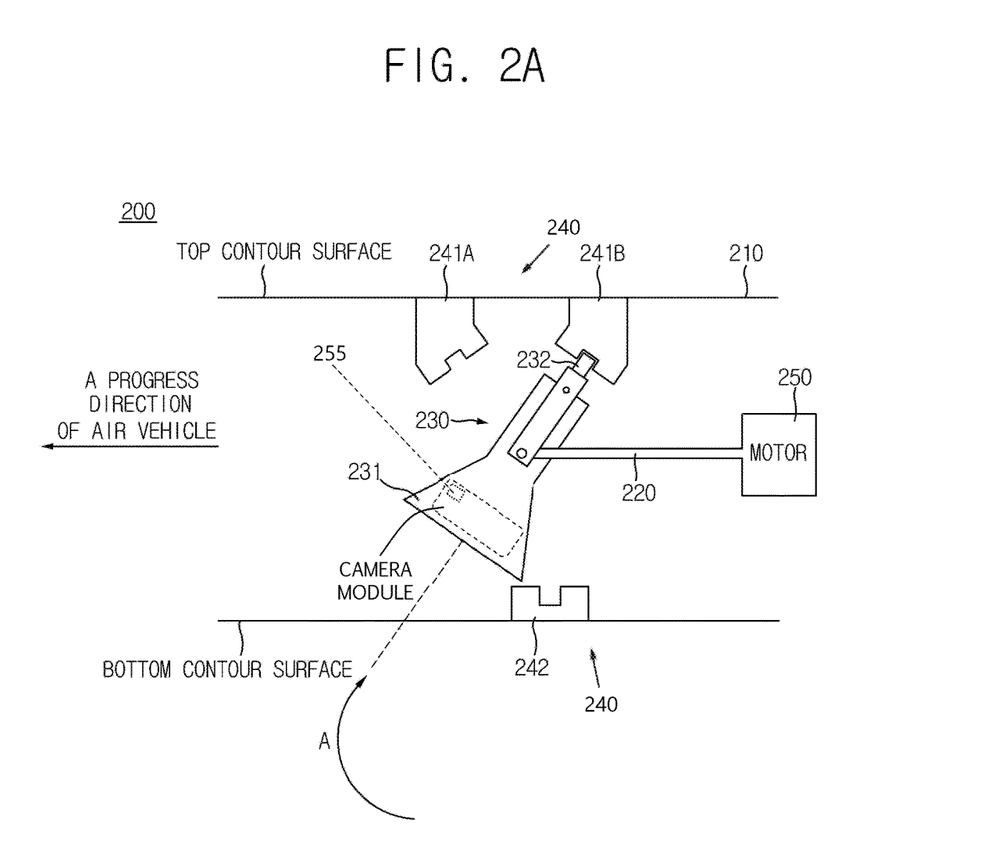
FIGS. 2A and 2B are drawings of cross section representing a configuration and an operation of an apparatus for meteorological observation in accordance with a second example embodiment of the present invention.
Figure 2B:
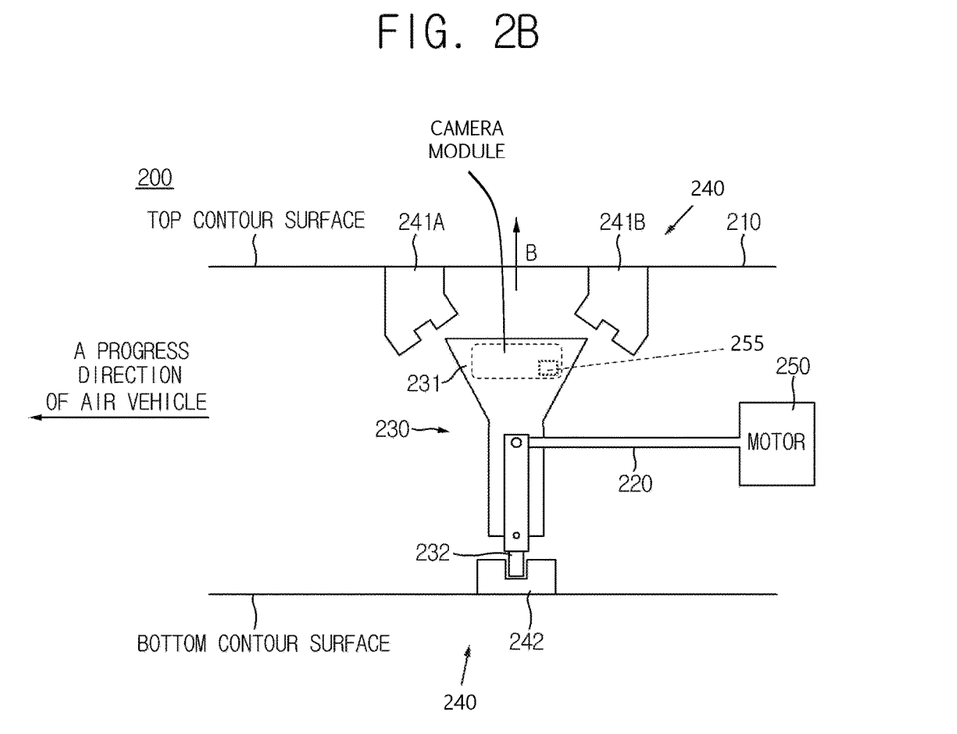

FIGS. 2A and 2B are drawings of cross section representing a configuration and an operation of an apparatus for meteorological observation in accordance with the second example embodiment of the present invention. By referring to FIGS. 2A and 2B, the apparatus 200 for meteorological observation may include a body part 210, a meteorological sensor part 230, at least one guiding member 240, a motor 250, and a shoot controlling part 255.

In addition, the apparatus 200 for meteorological observation may further include a connection part 220 for providing a rotational force of the motor 250 to allow the meteorological sensor part 230 to move along the guiding member 240 formed on the surface of the body part 210. More specifically, one end of the connection part 220 may be connected to the motor 250 while the other end of the connection part 220 is connected to the center of the meteorological sensor part 230 to thereby allow the meteorological sensor part 230 to rotate according to the operation of the motor 250. Of course, it is not always necessary for the other end of the connection part 220 to be connected to the center of the meteorological sensor part 230 and a variety of example embodiments for providing the rotational force of the motor 250 could be considered by making the other end of the connection part 220 directly or indirectly connected to a certain position of the meteorological sensor part 230.

By referring to FIGS. 2A and 2B, the apparatus 200 for meteorological observation includes the body part 210 formed in a cylindrical shape with a cross section in a specific shape. In the body part 210, the meteorological sensor part 230 and the guiding members 240 may be placed and the guiding members 240 may include top guiding members 241 which have two branches 241A and 241B and a bottom guiding member 242.

More preferentially, the top guiding members 241 are formed on a top contour surface and the bottom guiding member 242 on a bottom contour surface of the body part 210. At least two branches 241A and 214B as the top guiding members 241 are branched off from both ends of the bottom guiding member 242. Contrary to the first example embodiment, the top guiding members 241 are formed on the top contour surface of the body part 210. Surely, the top guiding members 241 are not necessary to be branched off to two branches, but it could be branched off to more than two.

The meteorological sensor part 230 may include a pin part 232 and a sensor module 231. At the time, the pin part 232 moves along a first guiding route and a second guiding route alternatively. Since the sensor module 231 is combined directly or indirectly with the pin part 232, it moves according to the movement of the pin part 232. For reference, FIGS. 2A and 2B illustrate that the sensor module 231 is indirectly combined with the pin part 232.

More specifically, the first guiding route includes a route branched off to the first branch 241B among the at least two top guiding members 241 and a route by the bottom guiding member 242 and the second guiding route includes a route by the second branch 241A and the route by the bottom guiding member 242.

To make the pin part 232 move along the first guiding route or the second guiding route, heights and angles of at least some of the top guiding members 241 and the bottom guiding member 242 may be adjusted. For example, the top guiding members 241 could be designed at a height and an angle at which the top guiding members 241 may interlock with the pin part 232 which will be capable of moving along the first and the second branches. Herein, the pin part 232 and the sensor module 231 may be combined with an angle therebetween being fixed but it is not limited thereto. As another example, an angle between the pin part and the sensor module could be adjusted.

While the pin part 232 moves along the first guiding route, when it is placed on a certain position on the route by the bottom guiding member 242, the sensor module 231 may look upwards corresponding to the movement of the pin part 232. At the time, the shoot controlling part 255 allows the sensor module 231 to obtain comparative data, so-called first comparative data, by measuring meteorological data of the upper atmosphere (indicated "B" in FIG. 2B).

Furthermore, while the pin part 232 moves along the first guiding route, when it is placed on a certain section of the route by the first branch 241B, the sensor module 231 may scan toward front lower directions corresponding to the certain section. At the time, the shoot controlling part 255 can control the sensor module 231 to measure meteorological data of the front lower atmosphere (indicated as "A" in FIG. 2A) (opposite to the first trajectory induced by the pin part). Herein, the measured meteorological data of the front lower atmosphere may be calibrated by referring to comparative data and reference data, which will be explained later.

While the pin part 232 moves along the second guiding route, when it is placed on a certain position on the route by the second branch, the sensor module 231 looks upwards by the movement of the pin part 232. At this time, the shoot controlling part 255 controls the sensor module 231 to measure meteorological data of the upper atmosphere (indicated as "B" in FIG. 2B) and obtain comparative data, so-called second comparative data. For reference, the first and the second comparative data may be used together or either may be used. This will be explained later by referring to FIG. 3.

Besides, while the pin part 232 moves along the second guiding route, when it is placed on a certain section of a route 241A by the second branch, the sensor module 231 scans toward rear lower directions corresponding to the certain section. At this time, the shoot controlling part 255 may control the sensor module 231 to measure meteorological data of the rear lower atmosphere (opposite to the second trajectory induced by the pin part). Herein, the measured meteorological data of the rear lower atmosphere may be calibrated by referring to the comparative data and the reference data to be explained later. For reference, although an example that the sensor module 231 measures the meteorological data of the rear lower atmosphere is not separately illustrated, since it is similar to the example in FIG. 1C, explanation thereabout can be omitted.

Herein, the scanned trajectory of the meteorological sensor part 230 in a direction opposite to the first trajectory and that in a direction opposite to the second trajectory may have a substantially circular shape if they are put together. Again, the first and the second trajectories represent the trajectories induced by the pin part 232, and it is made clear again that the direction of the trajectory induced by the pin part 232 is opposite to the direction scanned by the meteorological sensor part 231 in the second example embodiment.

Similarly, the meteorological sensor part may include multiple sensor modules connected to the motor 250 through the connection part 220.

Figure 3:
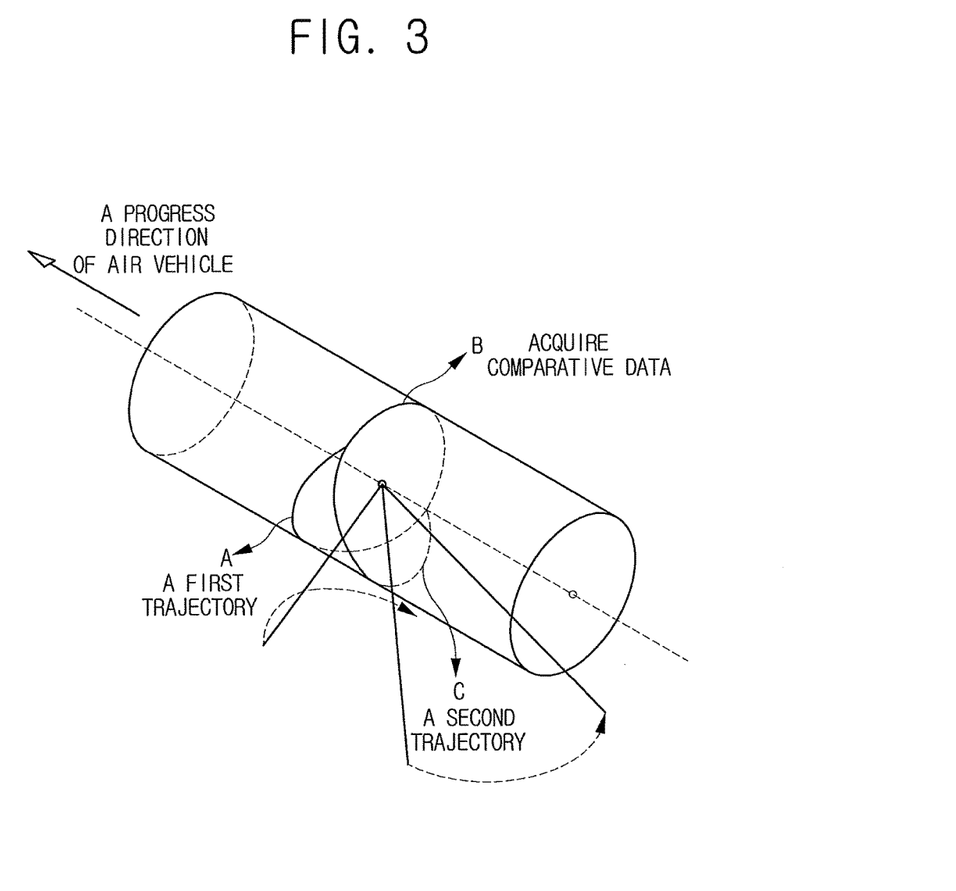
FIG. 3 is a drawing illustrating all routes of movement of a meteorological sensor part along a surface of a body part in accordance with the present invention.

FIG. 3 illustrates processes of obtaining meteorological data while the apparatus 100 is moving along the first guiding route and the second guiding route in accordance with the first example embodiment of the present invention.

By referring to FIG. 3, a state of the meteorological sensor part obtaining meteorological data while scanning on a certain section of the first branch branched off to the front lower part when moving along the first guiding route is indicated as "A". Thereafter, a state of the meteorological sensor part obtaining meteorological data, i.e., the first comparative data, while scanning toward the upper part of the atmosphere on a certain point on the top guiding member when moving along the first guiding route is indicated as "B". Then, a state of the meteorological sensor part obtaining meteorological data while scanning on a certain section of the second branch branched off to the rear lower part when moving along the second guiding route is indicated as "C". Thereafter, a state of the meteorological sensor part obtaining meteorological data, i.e., the second comparative data, while scanning toward the upper part of the atmosphere on a certain point on the top guiding member when moving along the second guiding route is indicated as "B".

As such, whenever it revolves around the body part, it may move along the first guiding route and the second guiding route alternatively. Similarly, to guide the movement by either of the first guiding route and the second guiding route, at least one additional guiding member (non-illustrated) could be also installed near at least one point of intersection of the first guiding route and the second guiding route. In FIG. 3, only an example regarding the first example embodiment is illustrated but similar explanation to this could apply even to the second example embodiment. So detailed explanation will be omitted.

Meanwhile, a method for calibrating meteorological data obtained from the front lower part thereof or the rear lower part thereof by referring to the comparative data and the reference data can be explained in accordance with the first example embodiment as follows: Of course, as the second example embodiment could be explained similarly, explanation will be omitted.

In other words, by referring to at least one of the first comparative data and the second comparative data, the meteorological sensor may calibrate the meteorological data obtained when it is placed on the bottom guiding member of the first guiding route and the bottom guiding member of the second guiding route. For example, if it is assumed that the comparative data measured from the meteorological sensor part is y degree and the reference temperature of the upper atmosphere is known to be constant as x degree, the meteorological data obtained by the meteorological sensor part may be considered to be at the state of being measured as high as "y−x". At this time, if meteorological data measured from the front lower part or the rear lower part by the meteorological sensor part is z, the accurate value could be obtained by calibrating the data to "z−(y−x)".

In accordance with the present invention, as meteorological data may be obtained without spatial distortion while only one motor is used, it is possible to reduce its load and its cost.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. An apparatus for meteorological observation that uses at least one meteorological sensor, comprising:
   a cylinder-shaped body part with a cross section in a certain shape, wherein the cross section is a section formed by cutting off the body part at a right angle to a longitudinal direction of the cylinder, wherein, on the assumption that the longitudinal direction of the cylinder of the body part is aligned substantially horizontally to the ground, a top guiding member is formed on a top contour surface of the body part and at least two bottom guiding members are formed on a bottom contour surface thereof, and wherein the at least two bottom guiding members, which include a first branch and a second branch, are branched off from both ends of the top guiding member;
   a coupling part which moves along a first and a second guiding routes alternatively by a specific motor, wherein the first guiding route includes the route by the top guiding member and a route by the first branch among the at least two bottom guiding members and the second guiding route includes the route by the top guiding member and a route by the second branch among the at least two bottom guiding members;

a meteorological sensor part which rotates according to a movement of the coupling part; and a shoot controlling part for operating (i) to allow the meteorological sensor part to measure meteorological data of the upper atmosphere when the coupling part is placed on a certain position of the route by the top guiding member while the coupling part moves along the first guiding route, (ii) to allow the meteorological sensor part to measure meteorological data of front lower atmosphere along a first trajectory when the coupling part is placed on a specified section of the route by the first branch while the coupling part moves along the first guiding route, (iii) to allow the meteorological sensor part to measure meteorological data of the upper atmosphere when the coupling part is placed on a certain position on the route by the top guiding member while the coupling part moves along the second guiding route, and (iv) to allow the meteorological sensor part to measure meteorological data of rear lower atmosphere along a second trajectory when the coupling part is placed on a specified section of the route by the second branch while the coupling part moves along the second guiding route.

2. The system of claim 1, wherein the coupling part includes a stick-shaped rod part, at either end of which a pin part is attached, and wherein, when the coupling part is moved by the motor, the pin part interlocking with the top guiding member or one of the bottom guiding members allows the coupling part to move and accordingly allows the meteorological sensor part to move.

3. The system of claim 2, wherein heights and angles of at least some of the top guiding member and the bottom guiding members are formed to make the pin part move along the first guiding route or the second guiding route.

4. The system of claim 2, wherein the pin part and the rod part are combined to make an angle between the pin part and the rod part be adjusted while the pin part moves along at least one of the first guiding route and the second guiding route.

5. The system of claim 1, further comprising: a center connection part for connecting the motor, a center of rotation of the coupling part and a center of rotation of the meteorological sensor part, and wherein the motor rotates the center connection part along the rotation axis of the motor to allow the coupling part to move.

6. The system of claim 5, further comprising: multiple auxiliary parts for connecting between both ends of the rod part of the coupling part and both ends of the meteorological sensor part, and wherein, when the motor rotates the center connection part along the rotation axis of the motor, the multiple auxiliary parts support the coupling part to move stably.

7. The system of claim 1, wherein the meteorological data obtained by the meteorological sensor part when the coupling part is placed on the first branch or the second branch is calibrated by referring to at least one of (1) first comparative data of the upper atmosphere the meteorological sensor part measured when the coupling part was placed at the certain position on the top guiding member while moving along the first guiding route and (2) second comparative data of the upper atmosphere the meteorological sensor part measured when the coupling part was placed at the certain position on the top guiding member while moving along the second guiding route.

8. The system of claim 1, wherein the meteorological sensor part is placed inside the body part, and wherein the top guiding member and the bottom guiding members are formed on an internal surface of the body part.

9. The system of claim 1, wherein the first and the second trajectories of the meteorological sensor part induced by the movement of the coupling part have a circular shape if the first and the second trajectories are put together.

10. The system of claim 1, wherein the meteorological sensor part includes multiple sensor modules and the multiple sensor modules rotate according to the movement of the coupling part.

11. The system of claim 10, further comprising: a center connection part for connecting the motor, a center of rotation of the coupling part and a center of rotation of individual multiple sensor modules, and wherein the motor rotates the center connection part along a rotation axis of the motor to allow the coupling part to move.

12. An apparatus for meteorological observation that uses at least one meteorological sensor, comprising:

a cylinder-shaped body part with a cross section in a certain shape, wherein the cross section is a section formed by cutting off the body part at a right angle to a longitudinal direction of the cylinder, wherein, on the assumption that the longitudinal direction of the cylinder of the body part is aligned substantially horizontally to the ground, at least two top guiding members are formed on a top contour surface of the body part and a bottom guiding member is formed on a bottom contour surface thereof, and wherein the at least two top guiding members, which include a first branch and a second branch, are branched off from both ends of the bottom guiding member;

a meteorological sensor part which includes a pin part and at least one sensor module, wherein the pin part which moves along a first and a second guiding routes alternatively by a specific motor, wherein the first guiding route includes a route by the first branch among the at least two top guiding members and a route by the bottom guiding member and the second guiding route includes a route by the second branch among the at least two top guiding members and the route by the bottom guiding member, and wherein the sensor module that moves along a moving trajectory of the pin part by being directly or indirectly combined with the pin part; and a shoot controlling part for operating (i) to allow the sensor module to measure meteorological data of the upper atmosphere when the pin part is placed on a certain position of the route by the bottom guiding member while the pin part moves along the first guiding route, (ii) to allow the sensor module to measure meteorological data of front lower atmosphere when the pin part is placed on a specified section of the route by the first branch while the pin part moves along the first guiding route, (iii) to allow the sensor module to measure meteorological data of the upper atmosphere when the pin part is placed on a certain position of the route by the bottom guiding member while the pin part moves along the second guiding route, and (iv) to allow the sensor module to measure meteorological data of rear lower atmosphere when the pin part is placed on a specified section of the route by the second branch while the pin part moves along the second guiding route.

13. The system of claim 12, further comprising: a connection part for providing a rotational force of the motor to the meteorological sensor part, and wherein the pin part moves along the first guiding route and the second guiding route alternatively by the rotational force provided through the connection part.

14. The system of claim 12, wherein heights and angles of at least some of the top guiding members and the bottom guiding member are determined to make the pin part move along the first guiding route or the second guiding route.

15. The system of claim 12, wherein the meteorological sensor part is allowed to measure meteorological data of front lower atmosphere opposite to a rear upper direction to which a groove formed on the first branch is directed and is allowed to measure meteorological data of rear lower atmosphere opposite to a front upper direction to which a groove formed on the second branch is directed.

16. The system of claim 12, wherein the meteorological data obtained by the sensor module when the pin part is placed on the first branch or the second branch is calibrated by referring to at least one of (1) first comparative data of the upper atmosphere the sensor module measured when the pin part was placed at the certain position of the route by the bottom guiding member while moving along the first guiding route and (2) second comparative data of the upper atmosphere the sensor module measured when the pin part was placed at the certain position of the route by the bottom guiding member while moving along the second guiding route.

17. The system of claim 12, wherein at least one additional guiding member is formed near at least one point of intersection of the first guiding route and the second guiding route to allow the pin part to move along the first guiding route and the second guiding route alternatively.

18. The system of claim 12, wherein scanned trajectories of the sensor module whose directions are opposite to the moving trajectories of the pin part have a circular shape if the trajectories are put together.

19. The system of claim 12, wherein the meteorological sensor part includes multiple sensor modules and their corresponding pin parts and wherein the respective pin parts are moved by the motor.

20. The system of claim 12, wherein the body part has a shape of a cam gear.

* * * * *